United States Patent
Komiya et al.

(10) Patent No.: US 6,714,065 B2
(45) Date of Patent: Mar. 30, 2004

(54) SEMICONDUCTOR DEVICE INCLUDING POWER SUPPLY CIRCUIT CONDUCTING CHARGE PUMPING OPERATION

(75) Inventors: Yuichiro Komiya, Hyogo (JP); Katsuyoshi Mitsui, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/983,871

(22) Filed: Oct. 26, 2001

(65) Prior Publication Data

US 2003/0080803 A1 May 1, 2003

(51) Int. Cl.[7] .................................................. G11C 7/00
(52) U.S. Cl. ........................ 327/537; 327/536; 327/589; 365/201
(58) Field of Search ................................ 327/536, 537, 327/589, 534, 535; 365/189.09, 189.11, 201

(56) References Cited

U.S. PATENT DOCUMENTS

| | | | |
|---|---|---|---|
| 5,757,228 A | * | 5/1998 | Furutani et al. ............. 327/536 |
| 6,212,107 B1 | * | 4/2001 | Tsukada ................. 365/189.09 |
| 6,349,063 B1 | * | 2/2002 | Jibu ....................... 365/189.11 |

* cited by examiner

*Primary Examiner*—Dinh T. Le
(74) *Attorney, Agent, or Firm*—McDermott, Will & Emery

(57) ABSTRACT

The boosting circuit provided in a semiconductor device includes a ring oscillator generating a pump clock having constant periods, a pump capacitor for performing a boost operation, and a pump capacitor input control unit provided between one electrode of the pump capacitor and the ring oscillator. The pump capacitor input control unit fixes one electrode of the pump capacitor to a prescribed voltage to apply stress of a desired level to the pump capacitor in response to a control signal that is activated at the time of burn-in test.

10 Claims, 7 Drawing Sheets

SEMICONDUCTOR DEVICE INCLUDING POWER SUPPLY CIRCUIT CONDUCTING CHARGE PUMPING OPERATION

BACKGROUND OF THE INVENTION

1. Field of the Invention

The present invention relates to semiconductor devices, and more particularly to a semiconductor device provided with a power supply circuit that generates an internal power supply voltage with a charge pumping operation.

2. Description of the Background Art

Currently, a burn-in test is conducted in a dynamic random access memory (DRAM) for the purposes of screening of a defective chip and evaluation of reliability. In a conventional burn-in test, such screening of the potential defective chip has been conducted by applying a high voltage to a chip operating in a high-temperature atmosphere to accelerate degradation of the defective portion.

In the generations on and after 0.25 μm, however, it has become impossible to apply a voltage high enough to allow thorough screening of defects in oxide films while a device after molding is in operation, because of the problem of reliability of a transistor including resistance to hot carrier. Therefore, it is common at present to perform the burn-in test in two stages, as a wafer level burn-in test and a regular burn-in test.

In the wafer level burn-in test, a defective chip potentially including a defect in the oxide film is screened by statically applying a stress voltage to the chip in the wafer state for a relatively short period of time, to accelerate elicitation of the defect. In the regular burn-in test being performed after molding, operational reliability is evaluated in the device level, by applying a high voltage in a high-temperature atmosphere over a long period of time.

In the DRAM, evaluation of the oxide film breakdown voltage is particularly necessary for a switching transistor of a memory cell and a switching transistor within a data line separating circuit, since a high gate-source voltage would be applied to these switching transistors.

FIG. 9 is a schematic diagram showing a configuration of a memory cell of a DRAM. In FIG. 9, one-element type DRAM cell is illustrated.

Referring to FIG. 9, the memory cell 10 includes a capacitor 11 storing data in the form of charges and a switching transistor 12. The gate of switching transistor 12 is connected to a word line WL. In response to activation of word line WL, switching transistor 12 electrically connects a data line DL to one electrode (storage node) of capacitor 11. The other electrode (cell plate electrode) of capacitor 11 is supplied with a cell plate voltage Vcp.

When word line WL is selected and set to an active state (high level), switching transistor 12 turns on, and the data stored in capacitor 11 is read out on data line DL.

Hereinafter, binary signal and voltage levels will be referred to as a high level and a low level, which will be expressed as "H level" and "L level", respectively.

A boosted voltage VPP is employed as a voltage corresponding to the active state of word line WL, such that a sufficient signal voltage is read out to data line DL despite the influence of the threshold voltage of the switching transistor being an NMOS transistor.

Specifically, a gate-source voltage of at most a VPP level is applied to a gate oxide film of switching transistor 12 when turned on. This makes switching transistor 12 more susceptible to a defect than the other portions.

Thus, in the wafer level burn-in test, a static stress voltage (hereinafter, also simply referred to as "stress") is applied to the oxide film of switching transistor 12, while fixing the level of word line WL to the boosted voltage VPP, to screen a potential defect therein. The explanation above also applies to the switching transistor within the data line separating circuit.

FIG. 10 is a circuit diagram showing a configuration of the data line separating circuit.

Referring to FIG. 10, the data line separating circuit 20 is arranged to allow a sense amplifier to be shared by bit lines placed on its either side, for reduction of a chip area.

Data line separating circuit 20 includes a sense amplifier 21 and switching transistors 23–28.

Sense amplifier 21 is shared by bit line pairs BLPL and BLPR located at its respective sides, and amplifies a voltage difference between sense nodes Ns and /Ns. Bit line pair BLPL includes bit lines BLL and /BLL for transmission of data complementary to each other. Likewise, bit line pair BLPR includes bit lines BLR and /BLR for transmission of data complementary to each other.

Switching transistor 23 is electrically connected between bit line BLL and sense node Ns. Switching transistor 24 is electrically connected between bit line /BLL and sense node /Ns. Switching transistor 25 is electrically connected between bit line BLR and sense node Ns, and switching transistor 26 is electrically connected between bit line /BLR and sense node /Ns.

Switching transistors 23 and 24 have their gates receiving a control signal BLIL that is activated to an H level when the bit line pair on the left side is selected. Likewise, switching transistors 25 and 26 have their gates receiving a control signal BLIR activated to an H level when the bit line pair on the right side is selected.

Data line separating circuit 20 further includes switching transistors 27 and 28 for connecting sense nodes Ns and /Ns to a data input/output line pair DIOP.

Switching transistor 27 is electrically connected between sense node Ns and a line DIO that is one of the complementary data input/output lines constituting the data input/output line pair DIOP. Switching transistor 28 is electrically connected between sense node /Ns and a line /DIO that is the other of the complementary data input/output lines. Switching transistors 27 and 28 have their gates receiving a control signal CS that is activated to an H level according to a result of column selection.

In such a data line separating circuit, a voltage of the boosted voltage VPP level is applied to the gates of switching transistors 23–28 such that the data of an H level can be read/written with respect to the bit lines or the data input/output lines at a sufficient signal voltage. Specifically, control signals BLIL, BLIR and CS are each set to the boosted voltage VPP at the time of an H level (of an active state).

Accordingly, a gate-source voltage of at most the VPP level is applied to the gate oxide films of switching transistors 23–28. Thus, in the wafer level burn-in test, it is necessary to conduct screening of potential defects of switching transistors 23–28, as in the case of the switching transistor within the memory cell, by applying constant stress to the oxide films thereof.

Boosted voltage VPP used as the ON voltage of these switching transistors is usually generated by a boosting circuit with a charge pumping operation.

FIG. 11 is a circuit diagram showing a configuration of a common boosting circuit as an example of the power supply circuit conducting the charge pumping operation. Shown in FIG. 11 is a so-called single boost type boosting circuit.

Referring to FIG. 11, the boosting circuit 30 includes a ring oscillator 31, N channel MOS transistors 32–35, MOS capacitors 36–38, and a clock transmission circuit 40. Clock transmission circuit 40 includes inverters 41–47. Hereinafter, N channel MOS transistor and P channel MOS transistor will be simply referred to as "NMOS transistor" and "PMOS transistor", respectively.

Ring oscillator 31 generates a pump clock PCLK having constant periods to a node N1. Inverters 43 and 47 transmit pump clock PCLK in phase to a node N2. Inverters 42 and 46 transmit pump clock PCLK in phase to a node N3. Inverters 41, 44 and 45 transmit pump clock PCLK in opposite phase to a node N4.

MOS capacitor 36 is coupled between nodes N2 and N5. MOS capacitor 37 is coupled between nodes N3 and N6. MOS capacitor 38 is coupled between nodes N4 and N7. MOS capacitors 36–38 are used to conduct the charge pumping operation.

NMOS transistor 35 is electrically connected between a power supply voltage VDD and node N7, and has its gate coupled to power supply voltage VDD. NMOS transistor 33 is electrically connected between power supply voltage VDD and node N5. NMOS transistor 34 is electrically connected between power supply voltage VDD and node N6. NMOS transistors 33 and 34 have their gates coupled to node N7.

NMOS transistor 32 is electrically connected between a node Np for supplying boosted voltage VPP and node N5, and has its gate coupled to node N6.

An operation of boosting circuit 30 will now be described.

When pump clock PCLK generated to node N1 by ring oscillator 31 is at an H level, node N5 is boosted by MOS capacitor 36. Likewise, node N6 is boosted by MOS capacitor 37, so that the gate of transistor 32 is boosted. As a result, the charges of the boosted node N5 can be sent out to node Np.

When pump clock PCLK is at an L level, nodes N5 and N6 are both at an L level. At this time, node N7 is boosted by MOS capacitor 38. Correspondingly, NMOS transistors 33 and 34 are turned on, so that nodes N5 and N6 are charged to the power supply voltage VDD level.

In this manner, as pump clock PCLK alternates between H and L levels at constant periods, the boosted charges are supplied to node Np, so that boosted voltage VPP is generated.

As a boosting pump capacitor for use in the boosting circuit, a MOS capacitor is usually preferred to a parallel-plate type capacitor, as the MOS capacitor has a thinner film and is able to hold charges of a larger capacity in the comparative area.

In a negative-voltage generating circuit with a similar configuration for generating a negative voltage with the charge pumping operation, a MOS capacitor is again employed as the pump capacitor. The negative voltage generated is used to prevent a leakage current of, e.g., a switching transistor in a memory cell.

FIG. 12 is a circuit diagram showing a configuration of a common negative-voltage generating circuit as another example of the power supply circuit conducting the charge pumping operation.

Referring to FIG. 12, the negative-voltage generating circuit 50 includes a ring oscillator 51, PMOS transistors 52–55, MOS capacitors 56–58, and a clock transmission circuit 60. Clock transmission circuit 60 includes inverters 61–68.

Ring oscillator 51 generates a pump clock PCLK having constant periods to a node N11. Inverters 63, 66 and 68 transmit pump clock PCLK in opposite phase to a node N12. Inverters 62, 65 and 67 transmit pump clock PCLK in opposite phase to a node N13. Inverters 61 and 64 transmit pump clock PCLK in phase to a node N14.

MOS capacitor 56 is coupled between nodes N12 and N15. MOS capacitor 57 is coupled between nodes N13 and N16, and MOS capacitor 58 is coupled between nodes N14 and N17.

PMOS transistor 55 is electrically connected between a ground voltage VSS and node N17, and has its gate coupled to node N17. PMOS transistor 53 is electrically connected between ground voltage VSS and node N15, and PMOS transistor 54 is electrically connected between ground voltage VSS and node N16. PMOS transistors 53 and 54 have their gates coupled to node N17.

PMOS transistor 52 is electrically connected between a node Nb for supplying a negative voltage VBB and node N15, and has its gate coupled to node N16.

In negative-voltage generating circuit 50, as pump clock PCLK alternates between H and L levels at constant periods, negative charges are sent to node Nb, so that negative voltage VBB is generated.

Unlike a normal MOS transistor, the MOS capacitor employed in the power supply circuit conducting the charge pumping operation, such as the boosting circuit and the negative-voltage generating circuit described above, requires a gate oxide film having a wide area to ensure a certain volume of capacity.

Each memory cell includes a MOS switching transistor. This MOS switching transistor has an extremely small gate area compared to the MOS capacitor for the charge pumping operation. In general, the gate area of one MOS capacitor for the charge pumping operation is approximately 1,000,000 times as large as the gate area of one MOS switching transistor.

Although these MOS elements different in function have MOS structures, the MOS capacitor for the charge pumping operation having such a huge gate oxide film area is much likely to suffer a defect due to a dust attached thereto or the like. If the oxide film of the MOS capacitor for the charge pumping operation actually suffers the defect, a normal function of the power supply circuit itself cannot be expected. Thus, there is a great necessity of screening such a potential defect.

In a conventional wafer level burn-in test, however, the voltage (stress) being applied to the MOS capacitor was not specified, so that the gate-source voltage of the MOS capacitor would vary during the test. With such a conventional burn-in test, sufficient screening of a potential defect for evaluation of the oxide film breakdown voltage was impossible.

In a regular burn-in test, unlike the case of the wafer level burn-in test in which a load is statically applied in a high-temperature atmosphere for a short period of time, a load would be applied at high temperature over a long period of time. Thus, the MOS capacitor having a large oxide film area was likely to suffer oxide film breakdown due to excessive stress applied thereto, so that there was a possibility that even those within a tolerance level would be misjudged as defective.

SUMMARY OF THE INVENTION

An object of the present invention is to provide a semiconductor device capable of setting stress being applied in a burn-in test to a MOS capacitor within a power supply circuit conducting a charge pumping operation.

The semiconductor device according to the present invention includes a power supply circuit that generates an internal power supply voltage by a charge pumping operation. The power supply circuit includes an oscillator generating a clock having constant periods, a pump capacitor having an oxide film that is formed between a first node and a second node, and a pump capacitor input control unit provided between the oscillator and the first node. The pump capacitor input control unit fixes a voltage of the first node such that a prescribed voltage is applied between the second node clamped to a first voltage and the first node in a burn-in test.

Preferably, the pump capacitor input control unit transmits a signal based on the clock to the first node in a normal operation.

Preferably, in the burn-in test conducted at a wafer level, the prescribed voltage is set such that stress of a desired level is applied to the oxide film.

Still preferably, in the burn-in test conducted after package molding, the prescribed voltage is set such that the stress being applied to the oxide film is restricted to a prescribed level.

Preferably, the pump capacitor input control unit sets the voltage of the first node to different levels in the burn-in test conducted at the wafer level and in the burn-in test conducted after the package molding.

Specifically, the pump capacitor input control unit sets the voltage of the first node such that stress of a desired level is applied to the oxide film in the burn-in test conducted at the wafer level and the stress being applied to the oxide film is restricted to a prescribed level in the burn-in test conducted after the package molding.

Alternatively, the pump capacitor input control unit preferably includes a select switch for switching voltage setting of the first node in the burn-in test between a second voltage for applying stress of a desired level to the oxide film and a third voltage for restricting the stress being applied to the oxide film to a prescribed level.

Still preferably, the third voltage is approximately equal to the first voltage.

Alternatively, the select switch has a metal interconnection selectively formed between a third internal node and one of a first internal node set to a fourth voltage in the burn-in test and a second internal node set to a fifth voltage, and the pump capacitor input control unit selects the voltage setting of the first node in the burn-in test according to a voltage of the third internal node.

Still preferably, the prescribed voltage corresponds to a power supply voltage that is set higher in the burn-in test than in the normal operation.

Accordingly, the main advantage of the present invention is that it is able to apply stress of a desired level to the pump capacitor within the power supply circuit in the burn-in test. In particular, at the time of the wafer level burn-in test, static stress can be intentionally applied to the gate oxide film of the pump capacitor, to carry out the screening test for accelerating the potential defect. In the regular burn-in test, it is possible to intentionally restrict the stress being applied to the gate oxide film of the pump capacitor, so that the oxide film breakdown due to excessive stress applied thereto can be prevented.

In addition, by switching the coupling of the select switch, it is possible to selectively set as to whether to intentionally apply stress to the pump capacitor in the burn-in test.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings.

First Embodiment

Figure 1:
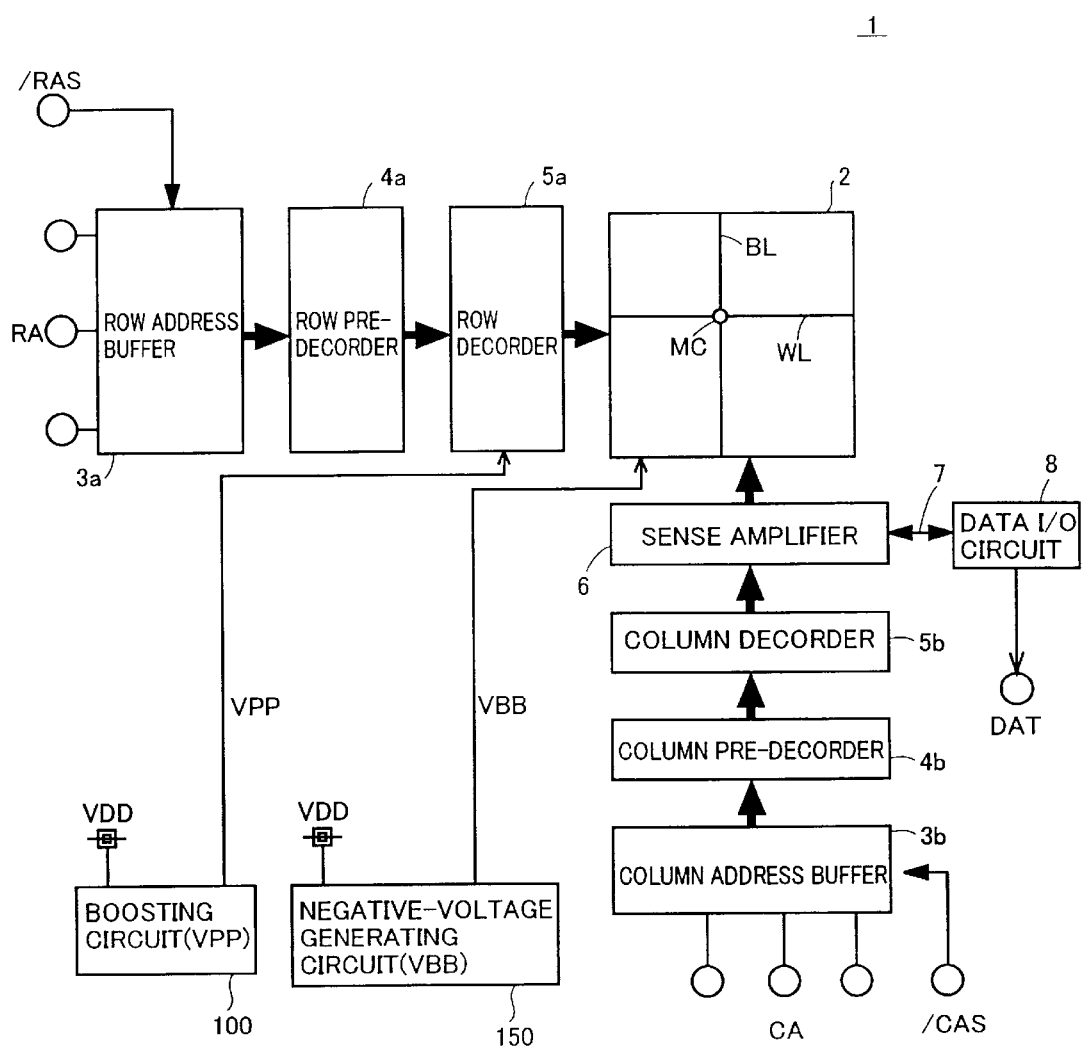
FIG. 1 is a block diagram showing an overall configuration of a semiconductor memory device as an example of the semiconductor device according to an embodiment of the present invention.

Referring to FIG. 1, the semiconductor memory device 1 shown as a representative example of the semiconductor device according to the present invention includes a memory array 2, a row address buffer 3a, a column address buffer 3b, a row pre-decoder 4a, a column pre-decoder 4b, a row decoder 5a, a column decoder 5b, a sense amplifier 6, a data input/output line 7, and a data input/output (I/O) circuit 8.

Memory array 2 includes memory cells MC arranged in rows and columns, word lines WL provided corresponding to the memory cell rows, and bit lines BL provided corresponding to the memory cell columns. In FIG. 1, an arrangement of the word line and the bit line corresponding to one memory cell MC is illustrated representatively. Each memory cell MC includes an access transistor and a data storage capacitor (not shown). The access transistor has its gate voltage controlled by the corresponding word line WL, and connects or disconnects the corresponding bit line BL to or from the data storage capacitor.

Row address buffer 3a responds to a row address strobe signal /RAS and takes in a row address RA input to an address terminals. Row pre-decoder 4a and row decoder 5a perform row selection based on the row address taken into row address buffer 3a, to selectively activate word lines WL. Accordingly, each of the data storage capacitors in the respective memory cells included in the selected memory cell row are connected to the corresponding bit line.

Column address buffer 3b responds to a column address strobe signal /CAS and takes in a column address CA input to the address terminals. Column pre-decoder 4b and column decoder 5b perform column selection based on the column address taken into column address buffer 3b. In accordance with the result of this column selection, the bit line BL corresponding to the selected memory cell column is connected to sense amplifier 6. Accordingly, the storage data of the memory cells selected as targets of data reading are detected and amplified by sense amplifier 6.

The read data from the selected memory cells amplified by sense amplifier 6 are transmitted via data I/O line 7 to data I/O circuit 8. Data I/O circuit 8 outputs the received read data as input/output data DAT from a data terminal.

In a data writing operation, data I/O circuit 8 applies input/output data DAT input to the data terminal to sense amplifier 6 via data I/O line 7. The row selection and the column selection in memory array 2 are executed as in the case of the data reading. Accordingly, the write data are written by sense amplifier 6 to the selected memory cells via the corresponding bit line.

Semiconductor memory device 1 is supplied with a power supply voltage VDD for operation. Semiconductor memory device 1 further includes a boosting circuit 100 and a negative-voltage generating circuit 150 that are provided as the power supply circuits for generating internal power supply voltages having levels different from that of power supply voltage VDD.

Boosting circuit 100 boosts power supply voltage VDD by the charge pumping operation, and generates a boosted voltage VPP corresponding to an active state of word line WL.

Negative-voltage generating circuit 150 is supplied with power supply voltage VDD, and generates a negative voltage VBB by the charge pumping operation. Negative voltage VBB is applied to the substrate region of memory array 2 to restrict a leakage current in the access transistor of each memory cell.

Hereinafter, the boosting circuit and the negative-voltage generating circuit will be described as representative examples of the power supply circuit that is mounted to a semiconductor device and performs the charging pumping operation.

Figure 2A:
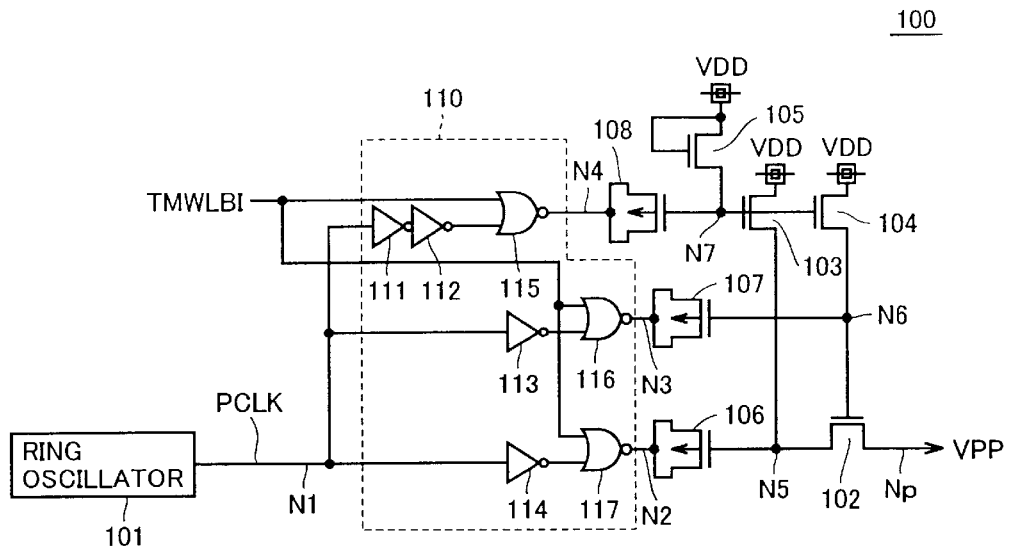
FIG. 2A is a circuit diagram showing a configuration of a boosting circuit as an example of the power supply circuit according to a first embodiment of the present invention.

Referring to FIG. 2A, the boosting circuit 100 shown as an example of the power supply circuit according to the first embodiment includes a ring oscillator 101, NMOS transistors 102–105, pump capacitors 106–108, and a pump capacitor input control unit 110.

Ring oscillator 101 generates a pump clock PCLK having constant periods to a node N1.

Pump capacitor 106 is coupled between nodes N2 and N5. Pump capacitor 107 is coupled between nodes N3 and N6, and pump capacitor 108 is coupled between nodes N4 and N7. As described above, MOS capacitors are employed as these pump capacitors 106–108 incorporated in the boosting circuit. Hereinafter, these pump capacitors are also simply called MOS capacitors.

NMOS transistor 105 is electrically connected between a power supply voltage VDD and node N7, and has its gate coupled to power supply voltage VDD. NMOS transistor 103 is electrically connected between power supply voltage VDD and node N5. NMOS transistor 104 is electrically connected between power supply voltage VDD and node N6. NMOS transistors 103 and 104 have their gates coupled to node N7.

NMOS transistor 102 is electrically connected between a node Np for supplying a boosted voltage VPP and node N5, and has its gate coupled to node N6.

Figure 11:
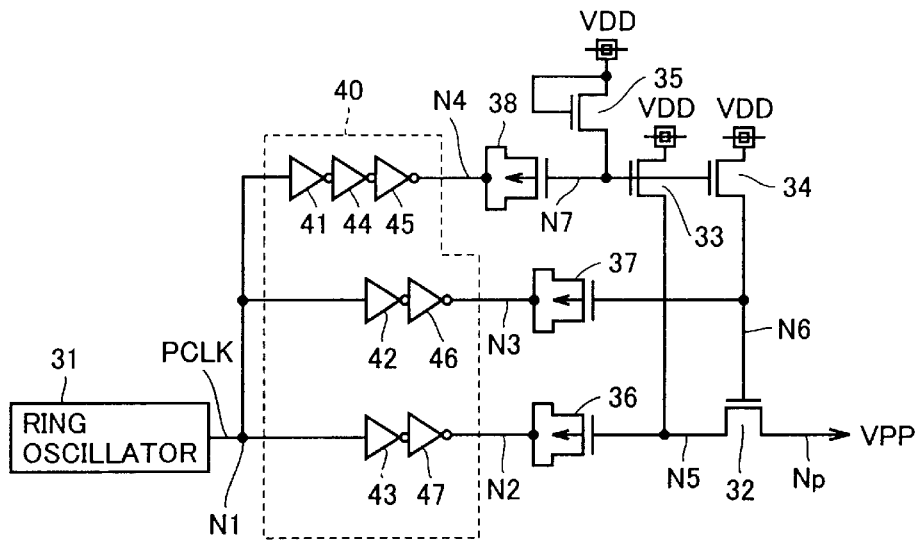
FIG. 11 is a circuit diagram showing a configuration of a conventional boosting circuit as an example of the power supply circuit conducting a charge pumping operation.

Namely, ring oscillator 101, NMOS transistors 102–105 and MOS capacitors 106–108 correspond respectively to ring oscillator 31, NMOS transistors 32–35 and MOS capacitors 36–38 shown in FIG. 11.

Pump capacitor input control unit 110 includes inverters 111–114 and NOR gates 115–117.

Inverters 111, 113 and 114 each invert pump clock PCLK output to node N1. Inverter 112 further inverts the output of inverter 111.

NOR gate 115 outputs a result of NOR operation of a test mode signal TMWLBI, which is activated to an H level (power supply voltage VDD) in the wafer level burn-in test, and the output of inverter 112 to node N4. NOR gate 116 outputs a NOR operation result of test mode signal TMWLBI and the output of inverter 113 to node N3. NOR gate 117 outputs a NOR operation result of test mode signal TMWLBI and the output of inverter 114 to node N2.

In the normal operation mode where test mode signal TMWLBI is inactivated to an L level (ground voltage GND), NOR gates 115–117 each operate as an inverter. As a result, pump capacitor input control unit 110 operates in the same manner as clock transmission circuit 40 shown in FIG. 11, and transmits pump clock PCLK in phase to nodes N2 and N3, and transmits pump clock PCLK in opposite phase to node N4.

Thus, in the normal operation mode, boosting circuit 100 generates boosted voltage VPP as in the boosting circuit 30 shown in FIG. 11.

By comparison, in the wafer level burn-in test where test mode signal TMWLBI is activated to an H level, NOR gates 115–117 each have one input set to the H level, so that nodes N2–N4 are each fixed to an L level (ground voltage GND). Nodes N5–N7 have each been clamped to power supply voltage VDD by NMOS transistors 103–105.

Accordingly, it is possible to intentionally apply static stress of power supply voltage VDD to the gate oxide films of respective MOS capacitors 106–108. At the time of the burn-in test, power supply voltage VDD is set to a prescribed level that is higher than in the normal operation mode to ensure that stress of a desired level is applied. As a result, the screening test for accelerating elicitation of potential defects of the MOS capacitors can be carried out in the wafer level burn-in test.

Figure 2B:
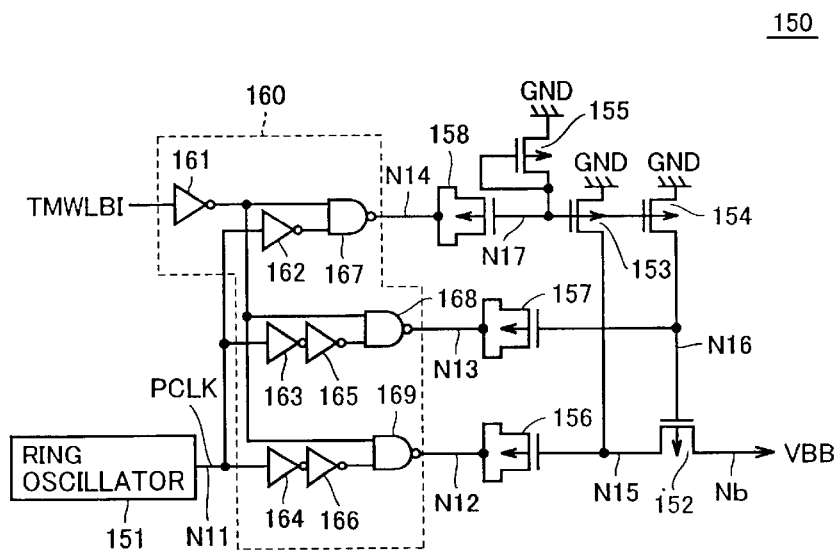
FIG. 2B is a circuit diagram showing a configuration of a negative-voltage generating circuit as another example of the power supply circuit according to the first embodiment.

Referring to FIG. 2B, the negative-voltage generating circuit 150 as another example of the power supply voltage according to a variation of the first embodiment includes a ring oscillator 151, PMOS transistors 152–155, pump capacitors 156–158, and a pump capacitor input control unit 160. Pump capacitor input control unit 160 includes inverters 161–166 and NAND gates 167–169.

Ring oscillator 151 generates a pump clock PCLK having constant periods to a node N11. Pump capacitor 156 is coupled between nodes N12 and N15. Pump capacitor 157 is coupled between nodes N13 and N16, and pump capacitor 158 is coupled between nodes N14 and N17. MOS capacitors are again employed as these pump capacitors 156–158 incorporated in the negative-voltage generating circuit. Thus, hereinafter, these pump capacitors are also simply referred to as MOS capacitors.

PMOS transistor 155 is electrically connected between a ground voltage GND and node N17, and has its gate coupled to node N17. PMOS transistor 153 is electrically connected between ground voltage GND and node N15, and PMOS transistor 154 is electrically connected between ground voltage GND and node N16. PMOS transistors 153 and 154 have their gates coupled to node N17.

PMOS transistor 152 is electrically connected between a node Nb for supplying a negative voltage VBB and node N15, and has its gate coupled to node N16.

Figure 12:
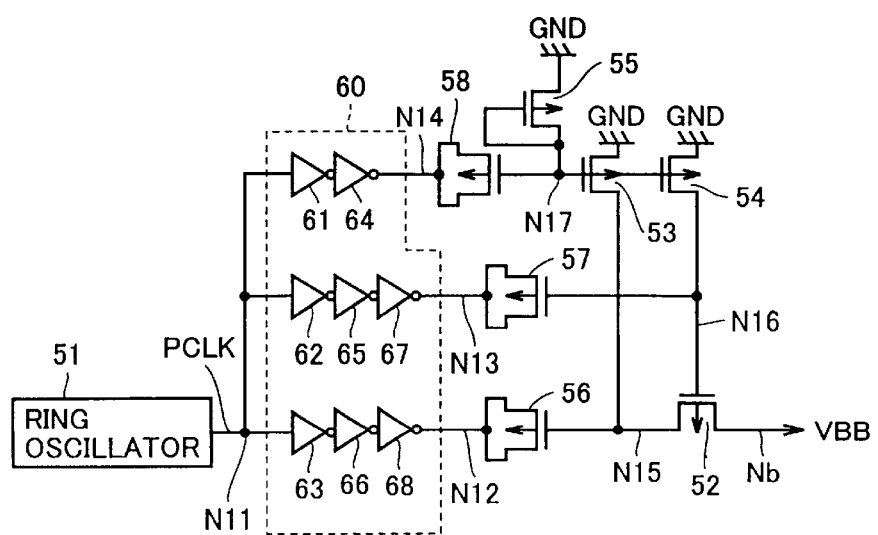
FIG. 12 is a circuit diagram showing a configuration of a conventional negative-voltage generating circuit as another example of the power supply circuit conducting the charge pumping operation.

That is, ring oscillator 151, PMOS transistors 152–155 and MOS capacitors 156–158 correspond respectively to ring oscillator 51, PMOS transistors 52–55 and MOS capacitors 56–58 shown in FIG. 12.

Pump capacitor input control unit 160 includes inverters 161–166 and NAND gates 167–169.

Inverter 161 inverts a test mode signal TMWLBI. Inverters 162–164 each invert pump clock PCLK output to node N1. Inverters 165 and 166 further invert the outputs of inverters 163 and 164, respectively.

NAND gate 167 outputs a result of NAND operation of the inverted signal of test mode signal TMWLBI and the output of inverter 162 to node N14. NAND gate 168 outputs a NAND operation result of the inverted signal of test mode signal TMWLBI and the output of inverter 165 to node N13. NAND gate 169 outputs a NAND operation result of the inverted signal of test mode signal TMWLBI and the output of inverter 166 to node N12.

In the normal operation mode where test mode signal TMWLBI is inactivated to an L level, NAND gates 167–169 each operate as an inverter. As a result, pump capacitor input control unit 160 operates in the same manner as the clock transmission circuit 60 shown in FIG. 12. Thus, in the normal operation mode, negative-voltage generating circuit 150 generates negative voltage VBB as in negative-voltage generating circuit 50 of FIG. 12.

By comparison, in the wafer level burn-in test where test mode signal TMWLBI is activated to an H level, NAND gates 167–169 each have one input set to the L level, so that nodes N12–N14 are each fixed to an H level (power supply voltage VDD). Nodes N15–N17 have each been clamped to ground voltage GND by PMOS transistors 153–155.

Accordingly, static stress of power supply voltage VDD can be intentionally applied to the gate oxide films of MOS capacitors 156–158. As a result, the screening test for accelerating elicitation of potential defects of the MOS capacitors can be carried out in the wafer level burn-in test.

Second Embodiment

In the second embodiment, a configuration is described which can prevent application of excessive stress to the gate oxide film of the pump capacitor at the time of a regular burn-in test that is conducted after the wafer having undergone the wafer level burn-in test is molded and packaged through an assembly process.

Figure 3:
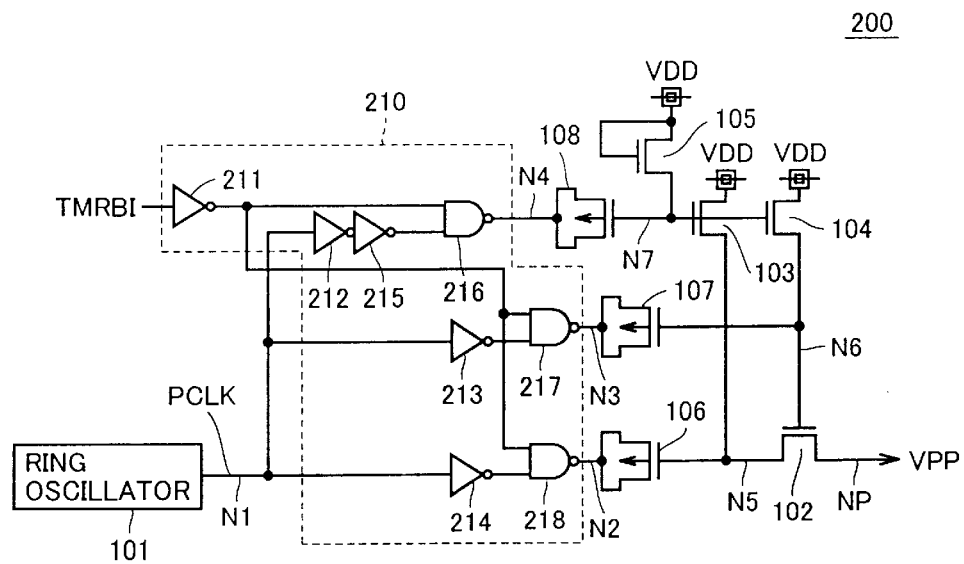
FIG. 3 is a circuit diagram showing a configuration of a boosting circuit as an example of the power supply circuit according to a second embodiment of the present invention.

Referring to FIG. 3, the boosting circuit 200 shown as an example of the power supply circuit according to the second embodiment is different from boosting circuit 100 shown in FIG. 2A in that it includes a pump capacitor input control unit 210 instead of pump capacitor input control unit 110.

Pump capacitor input control unit 210 includes inverters 211–215 and NAND gates 216–218.

Inverter 211 inverts a test mode signal TMRBI that is activated to an H level (power supply voltage VDD) at the time of the regular burn-in test. The output of inverter 211 is transmitted to one input of each of NAND gates 216–218. Inverters 212–214 each invert pump clock PCLK. Inverter 215 further inverts the output of inverter 212.

NAND gate 216 outputs a result of NAND operation of the inverted signal of test mode signal TMRBI and the output of inverter 215 to node N4. NAND gate 217 outputs a NAND operation result of the inverted signal of test mode signal TMRBI and the output of inverter 213 to node N3. NAND gate 218 outputs a NAND operation result of the inverted signal of test mode signal TMRBI and the output of inverter 214 to node N2.

In the normal operation mode where test mode signal TMRBI is inactivated to an L level (ground voltage GND), NAND gates 216–218 each operate as an inverter. As a result, pump capacitor input control unit 210 operates in the same manner as clock transmission circuit 40 shown in FIG. 11. Thus, in the normal operation mode, boosting circuit 200 generates boosted voltage VPP as in boosting circuit 30 of FIG. 11.

By comparison, in the regular burn-in test where test mode signal TMRBI is activated to an H level, pump capacitor input control unit 210 fixes each of nodes N2–N4 to an H level (power supply voltage VDD) by setting one input of each of NAND gates 216–218 to an L level. Nodes N5–N7 have each been clamped to power supply voltage VDD by NMOS transistors 103–105.

Thus, in the regular burn-in test, it is possible to intentionally restrict the stress being applied to the gate oxide films of respective MOS capacitors 106–108 within the boosting circuit to a prescribed level. As a result, the oxide film breakdown due to application of excessive stress can be avoided.

Figure 4:
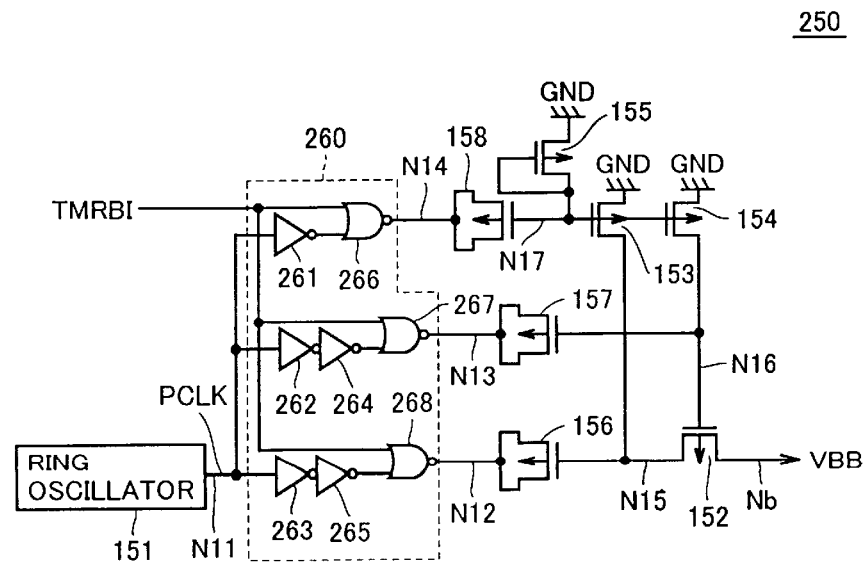
FIG. 4 is a circuit diagram showing a configuration of a negative-voltage generating circuit as another example of the power supply circuit according to the second embodiment.

Now, referring to FIG. 4, the negative-voltage generating circuit 250 shown as another example of the power supply circuit according to the second embodiment differs from negative-voltage generating circuit 150 shown in FIG. 2B in that it is provided with a pump capacitor input control unit 260 instead of pump capacitor input control unit 160.

Pump capacitor input control unit 260 includes inverters 261–265 and NOR gates 266–268.

Test mode signal TMRBI is transmitted to one input of each of NOR gates 266–268. Inverters 261–263 each invert pump clock PCLK. Inverters 264 and 265 further invert the outputs of inverters 262 and 263, respectively.

NOR gate 266 outputs a NOR operation result of test mode signal TMRBI and the output of inverter 261 to node N14. NOR gate 267 outputs a NOR operation result of test mode signal TMRBI and the output of inverter 264 to node N13. NOR gate 268 outputs a NOR operation result of test mode signal TMRBI and the output of inverter 265 to node N12.

In the normal operation mode where test mode signal TMRBI is inactivated to an L level, NOR gates 266–268 each operate as an inverter. As a result, pump capacitor input control unit 260 operates in the same manner as clock transmission circuit 60 shown in FIG. 12. Thus, in the normal operation mode, negative-voltage generating circuit 250 generates negative voltage VBB as in negative-voltage generating circuit 50 of FIG. 12.

By comparison, in the regular burn-in test where test mode signal TMRBI is activated to an H level, pump capacitor input control unit 260 fixes each of nodes N12–N14 to an L level (ground voltage GND) by setting one input of each of NOR gates 266–268 to an H level. Nodes N15–N17 have each been clamped to ground voltage GND by PMOS transistors 153–155.

Thus, in the regular burn-in test, the stress to be applied to the gate oxide films of respective MOS capacitors 156–158 within the negative-voltage generating circuit can be intentionally restricted to a prescribed level.

In particular, if a voltage difference between the plates of each MOS capacitor is set to zero as in the configurations shown in FIGS. 3 and 4, it is possible to minimize the stress being applied to the MOS capacitor in the regular burn-in test.

As explained above, according to the second embodiment, it is possible to prevent the oxide film breakdown of the pump capacitor (MOS capacitor) within the power supply circuit that would be otherwise caused by excessive stress being applied to the gate oxide film at the time of the regular burn-in test.

Third Embodiment

In the third embodiment, a configuration is described which allows static stress of at least a prescribed level to be intentionally applied at the time of the wafer level burn-in test and prevents excessive stress from being applied at the time of the regular burn-in test, by a combination of the first and second embodiments.

Figure 5:
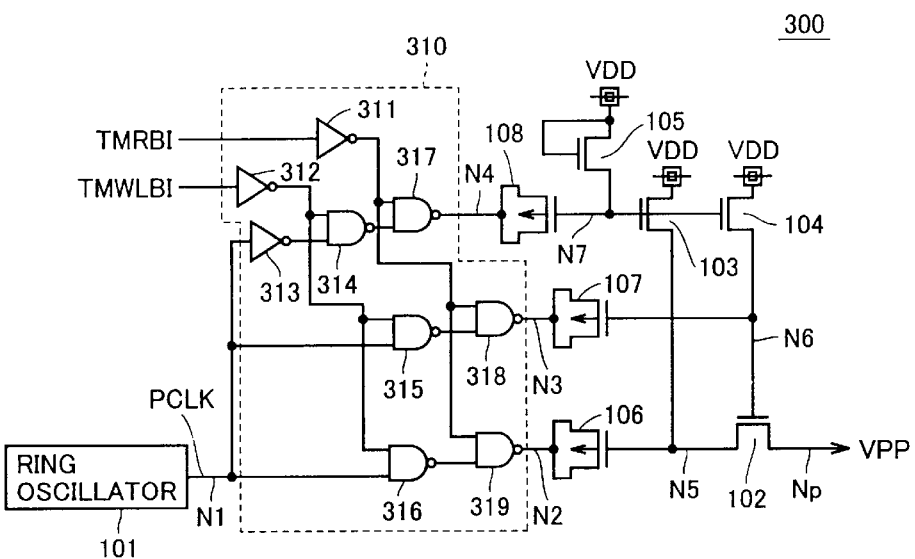
FIG. 5 is a circuit diagram showing a configuration of a boosting circuit as an example of the power supply circuit according to a third embodiment of the present invention.

Referring to FIG. 5, the boosting circuit 300 as an example of the power supply circuit according to the third embodiment differs from boosting circuit 100 shown in FIG. 2A in that it is provided with a pump capacitor input control unit 310 instead of pump capacitor input control unit 110.

Pump capacitor input control unit 310 includes inverters 311–313 and NAND gates 314–319. Inverter 311 inverts test mode signal TMRBI. Inverter 312 inverts test mode signal TMWLBI. Inverter 313 inverts pump clock PCLK.

NAND gate 314 outputs a NAND operation result of the inverted signal of test mode signal TMWLBI and the output signal of inverter 313. NAND gates 315 and 316 each output a NAND operation result of the inverted signal of test mode signal TMWLBI and pump clock PCLK.

NAND gate 317 outputs a NAND operation result of the output of NAND gate 314 and the inverted signal of test mode signal TMRBI to node N4. NAND gate 318 outputs a NAND operation result of the inverted signal of test mode signal TMRBI and the output of NAND gate 315 to node N3. NAND gate 319 outputs a NAND operation result of the output of NAND gate 316 and the inverted signal of test mode signal TMRBI to node N2.

Thus, in the normal operation mode where test mode signals TMRBI and TMWLBI are both inactivated to an L level, one input of each of NAND gates 314–319 is set to an H level, so that NAND gates 314–319 each operate as an inverter.

As a result, pump capacitor input control unit 310 operates in the same manner as clock transmission circuit 40 shown in FIG. 11. Therefore, in the normal operation mode, boosting circuit 300 generates boosted voltage VPP as in boosting circuit 30 shown in FIG. 11.

In the wafer level burn-in test, test mode signal TMWLBI is activated to an H level and test mode signal TMRBI is inactivated to an L level. Thus, the outputs of respective NAND gates 314–316 are fixed to an H level. In response thereto, the outputs of NAND gates 317–319 are fixed to an L level.

As a result, in the wafer level burn-in test, nodes N2–N4 are fixed to an L level (ground voltage GND) as in boosting circuit 100 shown in FIG. 2A. Accordingly, static stress of power supply voltage VDD can be intentionally applied to the gate oxide films of respective MOS capacitors 106–108 within the boosting circuit in the wafer level burn-in test, as in the case of boosting circuit 100 of FIG. 2A. As a result, the screening test for accelerating elicitation of potential defects of the MOS capacitors can be carried out at the time of the wafer level burn-in test.

In the regular burn-in test, test mode signal TMRBI is activated to an H level, and test mode signal TMWLBI is inactivated to an L level. Thus, one input of each of NAND gates 317–319 is fixed to an L level, so that nodes N2–N4 are each set to an H level (power supply voltage VDD).

As a result, as in boosting circuit 200 shown in FIG. 3, the stress being applied to the gate oxide films of respective MOS capacitors 106–108 can be restricted intentionally at the time of the regular burn-in test.

Figure 6:
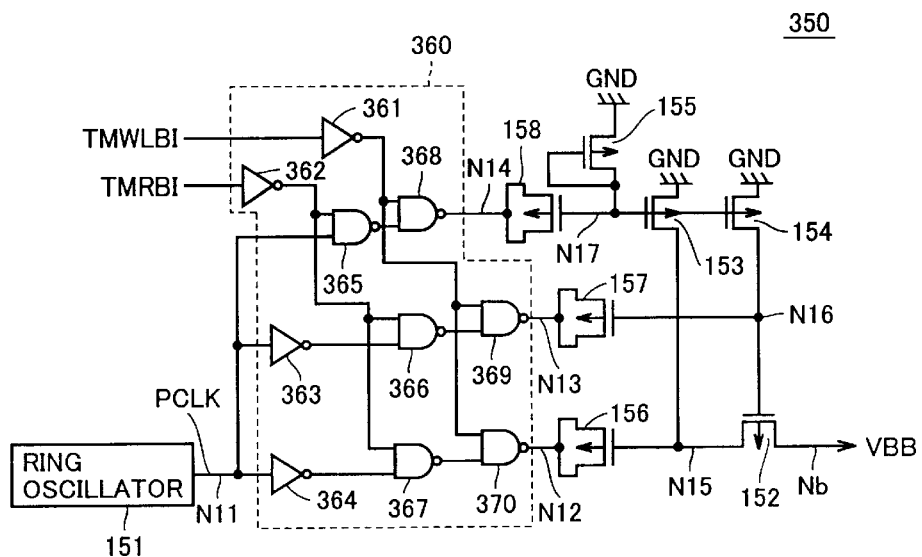
FIG. 6 is a circuit diagram showing a configuration of a negative-voltage generating circuit as another example of the power supply circuit according to the third embodiment.

Now, referring to FIG. 6, the negative-voltage generating circuit 350 as another example of the power supply circuit according to the third embodiment is different from negative-voltage generating circuit 150 shown in FIG. 2B in that it is provided with a pump capacitor input control unit 360 instead of pump capacitor input control unit 160.

Pump capacitor input control unit 360 includes inverters 361–364 and NAND gates 365–370. Inverter 361 inverts test mode signal TMWLBI. Inverter 362 inverts test mode signal TMRBI. Inverters 363 and 364 each invert pump clock PCLK.

NAND gate 365 outputs a NAND operation result of the inverted signal of test mode signal TMRBI and pump clock PCLK. NAND gate 366 outputs a NAND operation result of the inverted signal of test mode signal TMRBI and the output of inverter 363. NAND gate 367 outputs a NAND operation result of the inverted signal of test mode signal TMRBI and the output of inverter 364.

NAND gate 368 outputs a NAND operation result of the output of NAND gate 365 and the inverted signal of test mode signal TMWLBI to node N14. NAND gate 369 outputs a NAND operation result of the output of NAND gate 366 and the inverted signal of test mode signal TMWLBI to node N13. NAND gate 370 outputs a NAND operation result of the output of NAND gate 367 and the inverted signal of test mode signal TMWLBI to node N12.

Thus, in the normal operation mode where test mode signals TMRBI and TMWLBI are both inactivated to an L level (ground voltage GND), one input of each of NAND gates 365–370 is set to an H level, so that NAND gates 365–370 each operate as an inverter.

As a result, in the normal operation mode, pump capacitor input control unit 360 operates in the same manner as clock transmission circuit 60 shown in FIG. 12. Thus, in the normal operation mode, negative-voltage generating circuit 350 generates negative voltage VBB as in negative-voltage generating circuit 50 of FIG. 12.

In the wafer level burn-in test, test mode signal TMWLBI is activated to an H level and test mode signal TMRBI is inactivated to an L level. Thus, one input of each of NAND gates 368–370 is set to an L level, so that nodes N12–N14 are each fixed to an H level (power supply voltage VDD), as in negative-voltage generating circuit 150 shown in FIG. 2B.

Accordingly, in the wafer level burn-in test, static stress of power supply voltage VDD can be intentionally applied to the gate oxide films of respective MOS capacitors 106–108 within the boosting circuit. As a result, it is possible to conduct the screening test for accelerating elicitation of potential defects of the MOS capacitors at the time of the wafer level burn-in test.

In the regular burn-in test, test mode signal TMRBI is activated to an H level and test mode signal TMWLBI is inactivated to an L level. Thus, the outputs of NAND gates 365–367 are each fixed to an H level. In response thereto, the outputs of NAND gates 368–370 are each fixed to an L level.

Thus, in the regular burn-in test, nodes N12–N14 are fixed to an L level (ground voltage GND), as in negative-voltage generating circuit 250 shown in FIG. 4. Accordingly, it is possible to intentionally restrict the stress being applied to the gate oxide films of respective MOS capacitors 156–158 within the negative-voltage generating circuit at the time of the regular burn-in test.

Fourth Embodiment

In the fourth embodiment, a configuration capable of selecting whether to apply stress for an accelerating test to the gate oxide film of the MOS capacitor at the time of the burn-in test will be described.

Figure 7:
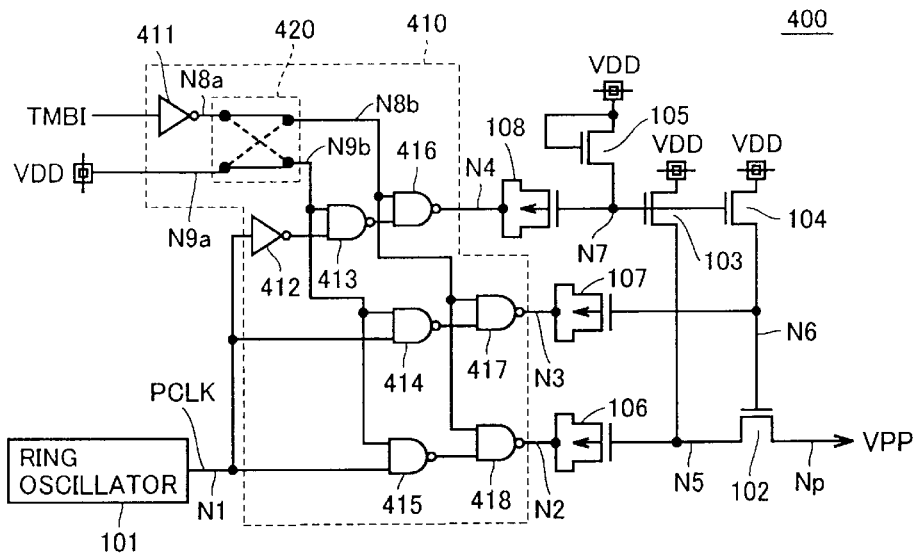
FIG. 7 is a circuit diagram showing a configuration of a boosting circuit as an example of the power supply circuit according to a fourth embodiment of the present invention.

Referring to FIG. 7, the boosting circuit 400 as an example of the power supply circuit according to the fourth embodiment differs from boosting circuit 100 shown in FIG. 2A in that pump capacitor input control unit 110 is replaced with a pump capacitor input control unit 410.

Pump capacitor input control unit 410 includes inverters 411, 412, NAND gates 413–418, and a select switch 420. Inverter 411 inverts a test mode signal TMBI that is activated to an H level (power supply voltage VDD) in the burn-in test, and transmits the inverted signal to a node N8a. A node N9a is coupled to power supply voltage VDD.

Select switch 420 selectively couples one of nodes N8a and N9a to one of nodes N8b and N9b.

Inverter 412 inverts pump clock PCLK. NAND gate 413 outputs a NAND operation result of the voltage level of node N9b and the output of inverter 412. NAND gates 414 and 415 each output a NAND operation result of the voltage level of node N9b and pump clock PCLK.

NAND gate 416 outputs a NAND operation result of the output of NAND gate 413 and the voltage level of node N8b to node N4. NAND gate 417 outputs a NAND operation result of the output of NAND gate 414 and the voltage level of node N8b to node N3. NAND gate 418 outputs a NAND operation result of the output of NAND gate 415 and the voltage level of node N8b to node N2.

In the normal operation mode where test mode signal TMBI is inactivated to an L level (ground voltage GND), nodes N8a and N9a are each fixed to an H level (power supply voltage VDD). Thus, regardless of the coupled state of select switch 420, nodes N8b and N9b are each set to an H level (power supply voltage VDD).

As a result, NAND gates 413–418 each operate as an inverter. Thus, in the normal operation mode, pump capacitor input control unit 410 operates in the same manner as clock transmission circuit 40 shown in FIG. 11, and therefore, boosting circuit 400 generates boosted voltage VPP in the normal operation mode, as in boosting circuit 30 shown in FIG. 11.

In the burn-in test where test mode signal TMBI is activated to an H level, the voltages of nodes N2–N4 change according to the coupled state of select switch 420.

First, in the case where nodes N8a and N9a are connected to nodes N8b and N9b, respectively, one input of each of NAND gates 416–418 is set to an L level (ground voltage GND), and therefore, nodes N2–N4 are each fixed to an H level of power supply voltage VDD. Thus, in this case, it is possible to select to intentionally restrict the stress being applied to the gate oxide films of respective MOS capacitors 156–158 at the time of the burn-in test, as in boosting circuit 200 shown in FIG. 3.

By comparison, in the case where node N8a is connected to node N9b and node N9a is connected to node N8b, the outputs of NAND gates 413–415 are each fixed to an H level (power supply voltage VDD). As a result, the outputs of NAND gates 416–418 are each fixed to an L level (ground voltage GND), so that nodes N2–N4 are each fixed to ground voltage GND.

Thus, in this case, it is possible to select to intentionally apply static stress of power supply voltage VDD to the gate oxide films of respective MOS capacitors 106–108 at the time of the burn-in test, as in boosting circuit 100 shown in FIG. 2A.

Figure 8:
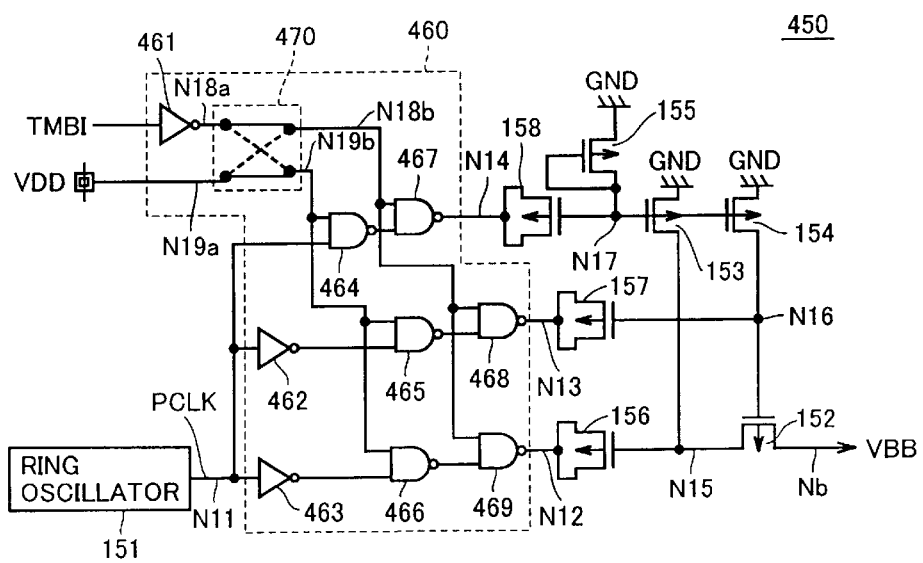
FIG. 8 is a circuit diagram showing a configuration of a negative-voltage generating circuit as another example of the power supply circuit according to the fourth embodiment.
Figure 9:
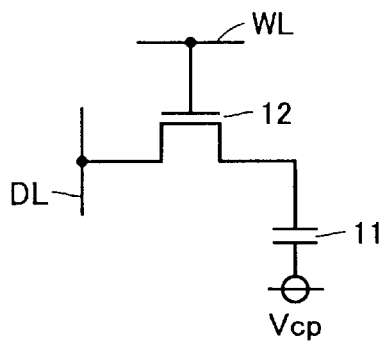
FIG. 9 is a schematic diagram showing a configuration of a memory cell of a DRAM.
Figure 10:
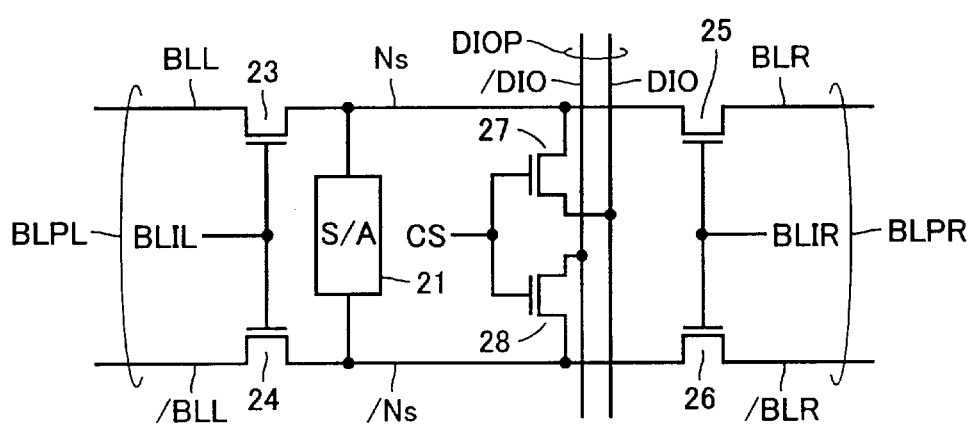
FIG. 10 is a circuit diagram showing a configuration of a data line separating circuit.

Now, referring to FIG. 8, the negative-voltage generating circuit 450 as another example of the power supply circuit according to the fourth embodiment differs from negative-voltage generating circuit 150 shown in FIG. 2B in that pump capacitor input control unit 160 is replaced with a pump capacitor input control unit 460.

Pump capacitor input control unit 460 includes inverters 461–463, NAND gates 464–469 and a select switch 470. Inverter 461 inverts test mode signal TMBI and transmits the inverted signal to a node N18a. A node N19a is coupled to power supply voltage VDD.

Select switch 470 selectively couples one of nodes N18a and N19a to one of nodes N18b and N19b.

Inverters 462 and 463 each invert pump clock PCLK. NAND gate 464 outputs a NAND operation result of the voltage level of node N19b and pump clock PCLK. NAND gate 465 outputs a NAND operation result of the voltage level of node N19b and the output of inverter 462. NAND gate 466 outputs a NAND operation result of the voltage level of node N19b and the output of inverter 463.

NAND gate 467 outputs a NAND operation result of the output of NAND gate 464 and the voltage level of node N18b to node N14. NAND gate 468 outputs a NAND operation result of the output of NAND gate 465 and the voltage level of node N18b to node N13. NAND gate 469 outputs a NAND operation result of the output of NAND gate 466 and the voltage level of node N18b to node N12.

In the normal operation mode where test mode signal TMBI is inactivated to an L level (ground voltage GND), nodes N18a and N19a are each fixed to an H level (power supply voltage VDD). Thus, regardless of the coupled state of select switch 470, nodes N18b and N19b are each set to an H level (power supply voltage VDD).

As a result, NAND gates 464–469 each operate as an inverter. Thus, in the normal operation mode, pump capacitor input control unit 460 operates in the same manner as clock transmission circuit 60 shown in FIG. 12, and accordingly, negative-voltage generating circuit 450 generates negative voltage VBB in the normal operation mode, as in negative-voltage generating circuit 50 shown in FIG. 12.

In the burn-in test where test mode signal TMBI is activated to an H level, the voltages of nodes N12–N14 change according to the coupled state of select switch 470.

First, in the case where nodes N18*a* and N19*a* are connected to nodes N18*b* and N19*b*, respectively, one input of each of NAND gates 467–469 is set to an L level (ground voltage GND), so that nodes N12–N14 are each fixed to an H level of power supply voltage VDD. Thus, in this case, it is possible to select to intentionally apply static stress of power supply voltage VDD to the gate oxide films of respective MOS capacitors 156–158 at the time of the burn-in test, as in negative-voltage generating circuit 150 shown in FIG. 2B.

By comparison, in the case where node N18*a* is connected to N19*b* and node N19*a* is connected to N18*b*, each output of NAND gates 464–466 is fixed to an H level (power supply voltage VDD). As a result, the outputs of w NAND gates 467–469 are each fixed to an L level, so that nodes N12–N14 are each fixed to ground voltage GND.

Thus, in this case, it is possible to select to intentionally restrict the stress being applied to the gate oxide films of respective MOS capacitors 156–158 at the time of the burn-in test, as in negative-voltage generating circuit 250 shown in FIG. 4.

As explained above, according to the fourth embodiment, selecting the coupling of select switches 420, 470 enables selective setting of whether to apply stress of a desired level to the gate oxide film of the MOS capacitor or to restrict the stress to a prescribed level at the time of the burn-in test.

Select switch 420 (or 470) can be physically configured with a metal switch that is a metal interconnection being selectively formed in a region between nodes N8*a*, N9*a* (or N18*a*, N19*a*) and nodes N8*b*, N9*b* (or N18*b*, N19*b*). Alternatively, an electric switch can be provided in the region between nodes N8*a*, N9*a* and nodes N8*b*, N9*b*, to switch the coupling of select switch 420 in response to another control signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device, comprising:
   a power supply circuit generating an internal power supply voltage by a charge pumping operation,
   said power supply circuit including
      an oscillator generating a clock having a substantially constant period,
      a pump capacitor having an oxide film, said pump capacitor being formed between a first node and a second node,
      a clamping unit clamping said second node to a first voltage in a burn-in test, and
      a pump capacitor input control unit provided between said oscillator and said first node, said pump capacitor input control unit being configured to apply a prescribed voltage between said first node and said second node during said burn-in test by fixing a voltage of said first node.

2. The semiconductor device according to claim 1, wherein said pump capacitor input control unit transmits a signal based on said clock to said first node in a normal operation.

3. The semiconductor device according to claim 1, wherein said burn-in test is conducted at a wafer level, and said prescribed voltage is set such that stress of a desired level is applied to said oxide film.

4. The semiconductor device according to claim 1, wherein said semiconductor device is configured such that said burn-in test can be conducted after said semiconductor device is packaged using a molding technique, and said prescribed voltage is set such that stress being applied to said oxide film is restricted to a prescribed level.

5. The semiconductor device according to claim 1, wherein said pump capacitor input control unit is configured to set said first node to different voltages when a burn-in test is conducted at a wafer level and wherein said semiconductor device is packaged using a molding technique.

6. The semiconductor device according to claim 5, wherein said pump capacitor input control unit sets the voltage of said first node in said burn-in test conducted at the wafer level such that stress of a desired level is applied to said oxide film, and sets the voltage of said first node in said burn-in test conducted after said semiconductor device is packaged such that the stress being applied to said oxide film is restricted to a prescribed level.

7. The semiconductor device according to claim 1, wherein said pump capacitor input control unit includes a select switch for switching a voltage setting of said first node in said burn-in test between a second voltage for applying stress of a desired level to said oxide film and a third voltage for restricting the stress being applied to said oxide film to a prescribed level.

8. The semiconductor device according to claim 7, wherein said third voltage is approximately equal to said first voltage.

9. The semiconductor device according to claim 7, wherein
   said select switch has a metal interconnection selectively formed between one of a first internal node that is set to a fourth voltage in said burn-in test and a second internal node that is set to a fifth voltage and a third internal node, and
   said pump capacitor input control unit selects the voltage setting of said first node in response to a voltage of said third internal node in said burn-in test.

10. The semiconductor device according to claim 1, wherein said prescribed voltage corresponds to a power supply voltage that is set higher in said burn-in test than in a normal operation.

* * * * *